April 26, 1955 J. R. DE BAUN 2,707,207

TELEVISION SYSTEM

Filed April 27, 1949 2 Sheets-Sheet 1

Inventor

JAMES R. DE BAUN

By [signature]

Attorney

April 26, 1955 J. R. DE BAUN 2,707,207

TELEVISION SYSTEM

Filed April 27, 1949 2 Sheets-Sheet 2

Inventor
JAMES R. DE BAUN

By

[signature] Attorney

United States Patent Office 2,707,207

Patented Apr. 26, 1955

2,707,207

TELEVISION SYSTEM

James R. De Baun, Greenvale, N. Y.

Application April 27, 1949, Serial No. 90,011

9 Claims. (Cl. 178—6.7)

(Granted under Title 35, U. S. Code (1952), sec. 266)

The present invention relates to television communication systems and more particularly to an apparatus for the transmission and reception at high speeds of monochromatic information such as maps, diagrams, and typewritten or other messages.

In conventional television communication systems, it has been the usual practice to transmit, along with the video signals containing the desired information, synchronizing signals permitting the desired receiver to lock in with the transmitter so that the information to be reproduced may be stabilized by the transmitted signals. The utilization of these synchronizing signals imposes a number of undesirable limitations on the system as a whole, among these being low efficiency, susceptibility to jamming, poor security, and poor channel selectivity.

Low efficiency results unless the transmission is solid, that is unless the information to be transmitted is fed into the system at a rate which utilizes the system full time. This follows from the fact that, for intermittent transmission, it is necessary to place the transmitter in operation and transmit information for a relatively considerable period to permit the receiver synchronizing system to lock in. This preparatory transmission period exceeds the actual signal transmission time by such a factor as to make it possible to transmit the same information in the same overall time by utilizing a much narrower band facsimile system.

In addition, whether the utilization factor is low (intermittent transmission) or high (solid transmission), jamming of a system employing synchronizing signals by pulse transmissions is readily accomplished, thus rendering such a system of little practical value where radar or other similar apparatus is also employed. An equally important limitation results from the fact that the utilization of synchronizing signals renders the transmission time appreciable, thus making the unauthorized or undesired reception and recording of the information readily feasible. In order to overcome this difficulty, it would be necessary to employ coding signals along with the synchronizing signals thereby making the equipment more costly and more complicated.

It is therefore proposed to provide a television system which will require no prolonged preparatory transmission, whether used intermittently or continuously, and will require no transmission of line frequency synchronizing information. In addition, it is proposed to provide a system having maximum security, that is rendering the possibility of detection and identification almost negligible.

The proposed system would utilize a triggering pulse at the start of each message, or frame, for identifying purposes. This pulse would be initiated by a delayed pulse at the transmitter, which would be derived from the shutter of the transmitting projector. In addition to initiating the triggering pulse, the pulse from the projector shutter would actuate a keying circuit to remove bias from the transmitter, and would actuate a delayed keying circuit to remove bias from the pickup tube at the transmitter.

The triggering pulse would precede the transmission of each frame and would be coded, this pulse operating to modulate the transmitter and key the frame sawtooth generator and the line oscillator at the transmitter. At the receiver, the triggering pulse would be identified by an appropriate selector; and would then start the frame sawtooth generator and the line oscillator, remove bias from the reproducing tube, and open the camera shutter. The maximum attainable speed of transmission should be limited only by the camera shutter speed, that is the start of transmission of the information must be delayed a sufficient time after the triggering pulse to permit the camera shutter to open. As explained hereinafter, speeds of 24,000 words per minute appear to be attainable.

Accordingly, it is an object of this invention to provide a high speed television communication system having a relatively high efficiency for both intermittent and continuous operation.

Another object is to provide a television communication system employing no preparatory transmission of synchronizing information.

A further object is to provide synchronization of the transmitter and receiver of a television system without employing synchronizing signals.

Still another object is the provision of an interference free high speed communication system insofar as pulse jamming or noise jamming of scanning stabilization is concerned.

A still further object is to increase the selectivity of a television system by providing initial identity pulse or pulses of coded characteristics.

An additional object of this invention is the provision of a television system having means for varying the initial or identity pulses transmitted to thereby prevent decoding and enhance the security of the system.

Other objects and features of the invention will become apparent to those skilled in the art as the disclosure is made in the following detailed description of a preferred embodiment of the invention as illustrated in the accompanying sheets of drawing in which.

Figure 1:
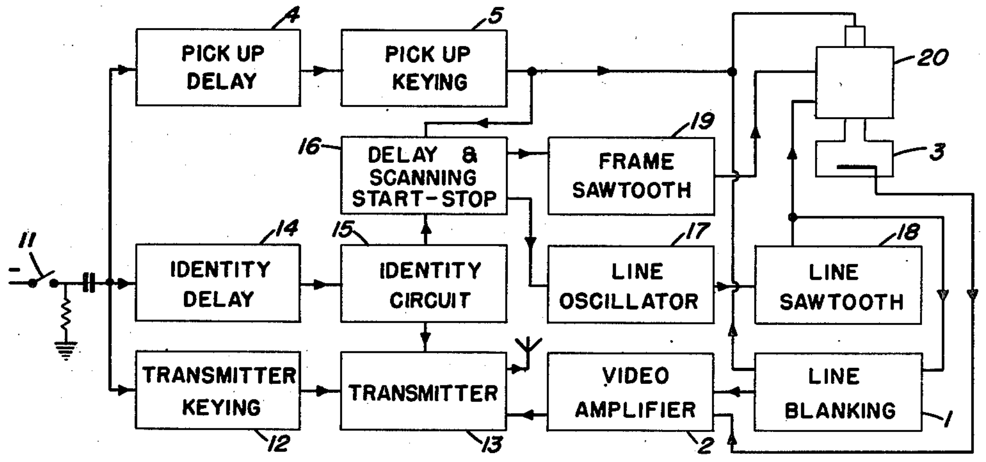
Fig. 1 is a diagrammatic view of a transmitting station according to the present invention.

Referring now to the drawings, wherein like reference characters designate like or corresponding parts throughout the several views, there is shown in Fig. 1 one form of transmitting station according to this invention, which comprises a switch 11, of any suitable type, associated with the projector, not shown, at the transmitter. Switch 11 is designed to make momentary contact at the start of transmission of each frame and feeds a negative pulse to the first set of elements at the station. If the transmission were of intermittent still pictures, switch 11 would be momentarily closed manually when transmission was desired.

Connected to the output end of switch 11 is a transmitter keying device 12 which is essentially an aperiodic electronic switch or multivibrator which produces a positive output of a duration equal to the time required for the transmission of one frame. Keying device 12 is actuated by the pulse from switch 11 to place operating bias on the output stage of transmitter 13.

Also connected to the output end of switch 11 is an identity delay circuit 14, of any convenient form, which is designed to introduce a few microseconds of delay before actuating identity circuit 15. This delay is required in order to permit transmitter 13 to achieve a steady state condition before applying the identifying signal thereto. Identity circuit 15 produces a combination of pulses which are fed to transmitter 13 and are the first modulations of the carrier for each frame transmitted. The purpose of the identity pulses is to identify the transmission at the receiver or receivers and to initiate operation of the receiver scanning reproducing-recording system for each frame, in a manner to be described below.

The output of identity circuit 15 is fed to delay and scanning start-stop circuit 16 which is activated after a fixed period after the reception of the identity pulses to cause both the frame and line frequency deflection circuits to operate for one frame. The amount of time delay required is a function of the time delay involved at the receiving station, which will be described below, the delays at the transmitting station and at the receiving station being necessarily equal for proper synchronism. The stop function of circuit 16 is effective to restore circuit 16 to a state of readiness for a new start and to stop line oscillator 17.

Figure 2:
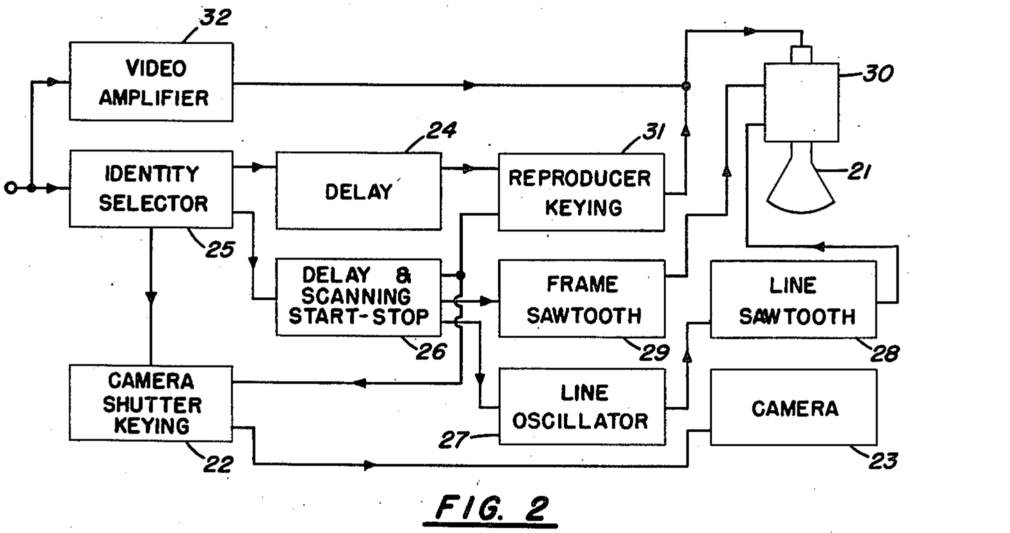
Fig. 2 is a diagrammatic view of a receiving station for use with the transmitting station of Fig. 1.

Line oscillator 17 must be stable to the extent of operation with negligible frequency drift for a period of one frame, and must be capable of starting in phase with the line oscillator 27 of the receiving station, as shown in Fig. 2, each time they are keyed on. If the line oscillators 17, 27 start at the same point in their cycle when keyed and if the fixed time delays are properly compensated, the scan at the receiving station will satisfactorily follow that of the transmitting station. A negative transconductance oscillator will meet these requirements.

Line sawtooth 18 and frame sawtooth 19 are conventional and serve merely to supply, respectively, line frequency deflection current and sawtooth deflection current to yoke 20. Line sawtooth 18 is connected to the output end of line oscillator 17 and frame sawtooth 19 is connected to the output end of delay and scanning circuit 16. Line blanking circuit 1 is conventional and derives its drive from the voltage developed across yoke 20, the blanking voltage being fed into and mixed with the video signal in video amplifier 2. The blanking voltage is also applied to pick up tube 3 to reduce scanning during retrace time. Video amplifier 2 is conventional and the output thereof is applied to transmitter 13 so as to modulate the carrier wave with the intelligence from pick up tube 3.

The output end of switch 11 is also connected to pick up delay 4 which in turn is connected to pick up keying circuit 5 for keying pick up tube 3 in the proper sequence and timing. For intermittent service, keying circuit 5 maintains pick up 3 biased off during intervals of no transmission, while during continuous operation, keying circuit 5 serves as pick up frame blanking. The amount of delay required in pick up delay 4 is a function of the delays involved in initiating scanning currents in yoke 20, all delays being referenced to the opening time of the shutter of camera at the receiving station (see Fig. 2). Thus, the operation of the shutter and the speed with which film can be pulled into position are the factors which determine the time between frames and the starting time for scanning.

Referring now to Fig. 2, wherein one form of receiving station according to this invention is disclosed, there is shown an identity selector 25 which is the opposite, electrically, of identity circuit 15 of Fig. 1. Selector 25 must have the ability to identify the modulation developed by identity circuit 15, and must substantially prevent triggering of the receiving unit from either noise or extraneous pulse transmissions. Selector 25 initiates action in camera shutter keying circuit 22 without any added delay to thereby drive the shutter and intermittent in camera 23.

Camera 23 must have some modifications from a conventional camera. Permissable and required exposure time is relatively long, of the order of $\frac{1}{25}$ to $\frac{1}{100}$ second, for current equipment and hence is not a difficult problem for the present system. However, opening and closing time plus time required for pulling a new frame of film in position are of great importance and will inevitably be the limiting factors in attaining maximum speed of transmission for the system of the present invention. This follows from the fact that the scanning on the reproducing tube 21 cannot be started until the shutter of camera 23 is open, and once a scan is complete a scan on a new frame cannot be started until the shutter has closed and the new frame of film is in position. It would be practical to construct the reproducing tube 21 and camera 23 in such manner as to eliminate the shutter, merely requiring an interval limited by the time required for the intermittent to pull new film into place between frames or successive scans.

The scanning currents for yoke 30 of reproducer tube 21 are supplied by frame sawtooth 29, and line oscillator 27 and line sawtooth 28, all of which are identical with their respective counterparts 19, 17, 18 at the transmitting station of Fig. 1. Actuation of these elements is controlled by delay and scanning start-stop circuit 26 which is identical with circuit 16, the delay in circuit 26 being required to permit the shutter of camera 23 to open at least partially before starting scanning. The means for controlling the bias on reproducer tube 21 comprises a delay circuit 24 and reproducer keying 31, which are approximately equal to elements 4 and 5, respectively, at the transmitting station, the amount of delay being approximately equal to that required for frame blanking time in conventional television systems.

It should be noted that the delay for opening the camera shutter fortunately coincides with the time that frame blanking would of necessity be applied. Thus, the frame sawtooth generator in both transmitter and receiver is only triggered when a new transmission is required. This is true for either intermittent or continuous transmission. Here, as in conventional television systems, the end of blanking will occur long enough after the sawtooth generator has been triggered to properly mask out return traces on the pick-up or reproducing devices and to properly mask out any transients in the deflection system. Therefore the time consumed by frame blanking is used also by the camera shutter. The net time required for shutter opening over the return time of frame scanning will be small.

It should also be noted that while "frame blanking" here is akin to that used in conventional television systems in that it masks off scanning return traces and transients, that is as far as the similarity goes. "Frame blanking" as here used (pick-up and reproducer keying) is aperiodic and of a variable duration. No "frame blanking" signal is transmitted. The only constant feature about the "frame blanking" in both transmitter and receiver is the duration of blanking after the triggering or identifying pulse.

Line blanking as such is a refinement, little being gained by its application at pick-up tube 3 and its transmission is not a necessity since it can be produced for reproducer 21 from reproducer yoke 30.

Figures 3, 4:
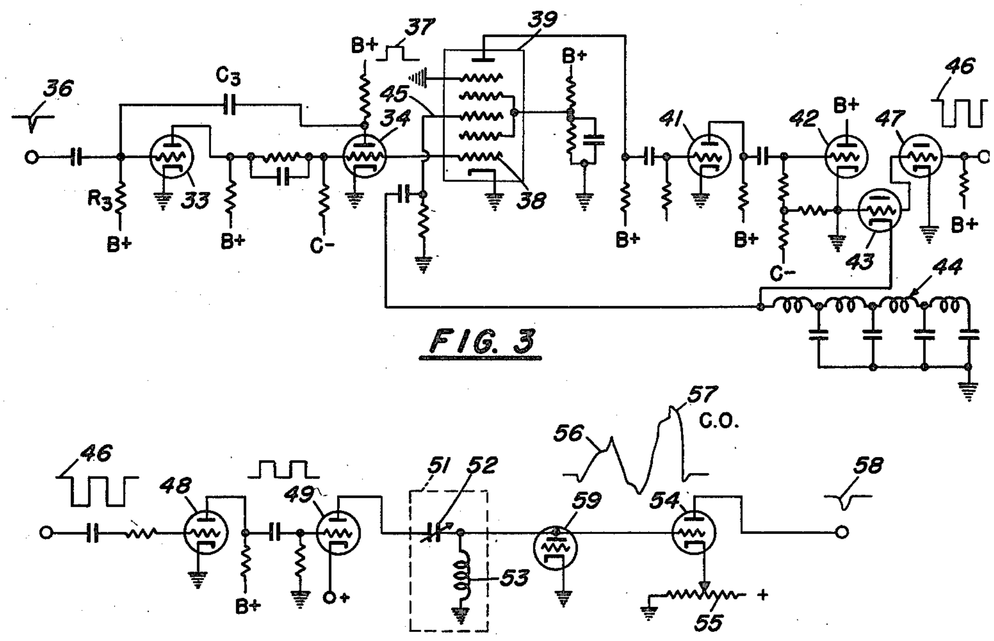
Fig. 3 illustrates one form of identity circuit which may be used at the transmitting station of Fig. 1.
Fig. 4 illustrates an identity selector for use with the identity circuit of Fig. 3.

One form of identity circuit 15 which may be utilized at the transmitting station of Fig. 1 is shown in detail in Fig. 3. Tubes 33 and 34 form a one-shot multivibrator with a positive grid return, the multivibrator being actuated by a negative pulse 36 to apply a positive pulse 37 to the grid 38 of tube 39. The length of this positive pulse, hence the duration of the identity pulse, is determined by the discharge path of $C_3$ and $R_3$, which can be varied. When grid 38 is driven positive by the positive pulse 37, tube 39 conducts fully applying a signal to tube 41 where the signal is amplified and fed to tubes 42 and 43 in order to provide a low impedance positive drive to delay network 44. This positive drive voltage is reflected from the shorted end of delay network 44 as a negative voltage which is fed back to grid 45 of tube 39 causing the plate of tube 39 to go positive. This appears at delay network 44 as a negative drive and is reflected positive, thus repeating the previous cycle until tubes 33 and 34 are restored to their normal state. Hence, even width even spaced pulses 46 are produced at the output end of tube 47, the width and spacing being determined by the length of delay network 44, and the number of pulses by $R_3$ $C_3$.

Referring now to Fig. 4, there is shown one form of identity selector 25 for use with the identity circuit of Fig. 3, selector 25 comprising a grid limiter 48 driving an amplifier tube 49 normally biased to cutoff. Tube 49 serves as a driver for a high Q resonant circuit 51 comprising a variable capacitor 52 and an inductance 53. Resonant circuit 51 is tuned to the spacing and width of the incoming pulses 46 with the resonant rise in voltage across inductance 53 appearing across the grid of tube 54, a change in width of the pulses requiring a retuning of circuit 51 while a change in number requires a resetting of bias resistor 55 for tube 54 which must be beyond cutoff.

The voltage fed to the grid of tube 54 is indicated at 56 in Fig. 4 and it can be seen that tube 54 conducts only at portion 57 of the input thereto producing a negative signal 58 at the output end of the identity selector 25. Tube 59 functions as a damping device such that conduction of tube 59 prevents the identity selector from refunctioning for the duration of a one frame scan.

Figure 5:
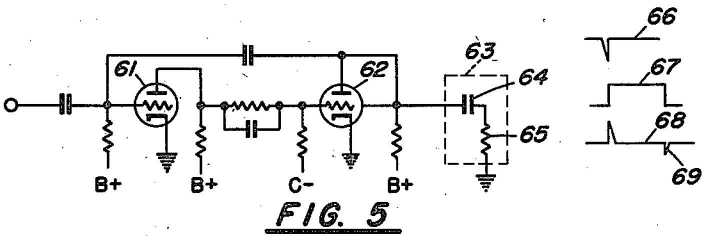
Fig. 5 shows a delay circuit capable of any amount of delay from a few seconds to a full frame.

Fig. 5 illustrates one form of delay network which may be incorporated into the system of the present invention, and comprises a pair of tubes 61 and 62 connected as a positive grid return multivibrator, the output of which is fed to a differentiating circuit 63 comprising a capacitor 64 and a resistor 65. The wave forms appearing at the input to the circuit, the input to differentiating circuit 63 and the output are shown at 66, 67 and 68, respectively, it being readily seen that negative pulse 69 is delayed behind input pulse 66 an amount determined by the RC discharge path of the multivibrator.

Figure 6:
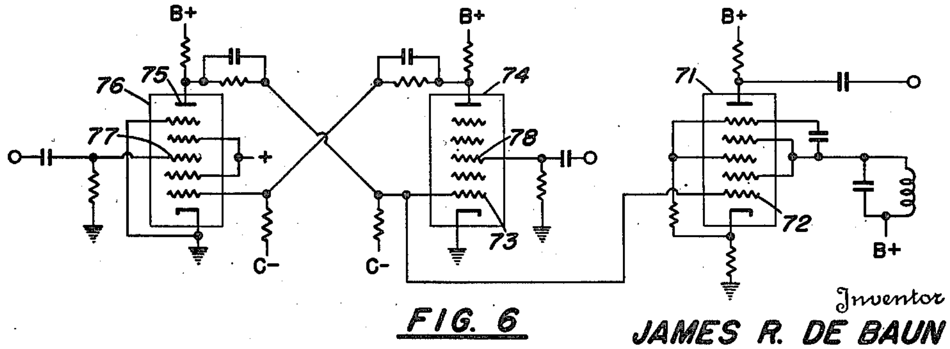
Fig. 6 illustrates one form of start-stop and line frequency oscillator circuit according to this invention.

Referring now to Fig. 6, there is shown a negative transconductance line frequency oscillator 71 having its control grid 72 connected to the grid 73 of tube 74 and to the plate 75 of tube 76. Tubes 74 and 76 are connected as a conventional electronic switch so that a negative pulse is required to start and to stop the same. Under normal operation, with no input signal, tube 76 conducts and the plate 75 is at a low positive voltage so that grid 73 of tube 74 and grid 72 of oscillator 71 are biased to cut off. When grid 77 of tube 76 is keyed negative there is a rise in voltage at plate 75 and a corresponding rise at grids 72 and 73 causing tube 74 to conduct, oscillator 71 to operate and tube 76 to be cut off. This operation continues until a negative signal is applied to grid 78 of tube 74 causing a reversal of conduction and again cutting off oscillator 71.

Various modifications are contemplated and may obviously be resorted to by those skilled in the art without departing from the spirit and scope of the invention, as hereinafter defined by the appended claims, as only a preferred embodiment thereof has been disclosed.

The invention described herein may be manufactured and used by or for the Government of the United States of America for governmental purposes without the payment of any royalties thereon or therefor.

What is claimed is:

1. In a television system, a television transmitter controlled by a control pulse and comprising, in combination, a transmitter keying circuit connected to receive said control pulse and to supply a keying pulse of a duration substantially equal to the time required for the transmission of one frame, a transmitter connected to said transmitter keying circuit so as to receive said keying pulse, an identity delay circuit connected to receive said control pulse, an identity signal generating circuit connected to the identity delay circuit, the identity signal generating circuit being connected to said transmitter to supply an identity signal thereto to modulate the carrier frequency after the beginning of said keying pulse, a pick-up keying circuit, a pick-up delay circuit connected to receive said control pulse and to supply an output signal to said pick-up keying circuit, television pick-up tube means operatively connected to said transmitter to supply a video signal thereto, and scanning means connected to said tube means and to said identity circuit for operating said tube means and said pick-up keying circuit during the time said transmitter is modulated by said identity signal.

2. A television transmitter as in claim 1 in combination with a receiver comprising an identity selector circuit connected to receive the transmitted signal and being of such construction as to be energized by the identity modulation in said transmitted signal, a reproducer tube and a camera including a shutter positioned to view said reproducer tube, a shutter keying circuit connected to said identity selector circuit to be energized thereby and operatively connected to said shutter, a reproducer keying circuit connected to said identity selector circuit through a time delay circuit, the time delay being the same as the time delay at the receiving station and being dependent upon the time required for the shutter to open, said reproducer keying circuit supplying an output to said reproducer tube for placing said tube in an operative condition, circuit means for applying the received video signal to the last named tube, and scanning means connected to said identity selector circuit and to said last named tube so as to reproduce the video information from said pickup tube on said reproducer tube so that the camera can record the information.

3. A television communication system comprising a transmitting station and a receiving station, said transmitting station including switch means for providing a control pulse for each frame to be transmitted, a transmitter normally biased in an off condition, a transmitter keying circuit connected to said switch means and to said transmitter for removing the bias from said transmitter for approximately one frame when energized by said control pulse, an identity signal generating circuit connected to said switch means through a first time delay network, a pickup tube normally biased off, a pickup keying circuit connected to said switch means through a second time delay network and to said tube for removing the bias from said tube for approximately one frame, said first and second time delay networks having the same time constant, scanning circuit means for said pickup tube, said scanning circuit when energized scanning for a period of one frame, means connecting said identity signal generating circuit to said transmitter for modulating the carrier frequency and to said scanning circuit for initiating the scanning operation, circuit means connecting the video output from said pickup tube to said transmitter for again modulating the carrier frequency, said receiving station having an identity selector circuit which is energized by the identity modulation component of said transmitted signal, a reproducer tube having a reproducer keying circuit and a second mentioned scanning circuit connected thereto, means connecting said identity selector circuit to said reproducer keying circuit and said second mentioned scanning circuit for turning the reproducer tube on and initiating the scanning operation, respectively, for a period of one frame when a signal is received by the identity selector circuit, and circuit means for supplying the video signal to said reproducer tube.

4. A television system as in claim 3 wherein a camera having a shutter is positioned to view the reproducer tube, a shutter keying circuit connected to said identity selector circuit and to said shutter, the aforementioned time constant being identical with the time requirement for opening said shutter.

5. In a television system, a transmitting station including switch means for providing a control pulse for each frame to be transmitted, a transmitter normally biased in an off condition, a transmitter keying circuit connected to said switch means and to said transmitter for removing the bias from said transmitter for approximately one frame when energized by said control pulse, an identity signal generating circuit connected to said switch means through a first time delay network, a pickup tube normally biased off, a pickup keying circuit connected to said switch means through a second time delay network and to said tube for removing the bias from said tube for approximately one frame, said first and second time delay networks having the same time constant, scanning circuit means for said pickup tube, said scanning circuit when energized scanning for a period of one frame, means connecting said identity signal generating circuit to said transmitter for modulating the carrier frequency and to said scanning circuit for initiating the scanning operation, and circuit means connecting the video output from said pickup tube to said transmitter for again modulating the carrier frequency.

6. In a television system as in claim 5, a receiver-recording station including an identity selector circuit which is energized by the identity signal applied to the carrier frequency, a reproducer tube having a scanning circuit, a reproducer keying circuit and a circuit for receiving the video signal, a camera having a shutter positioned to view said reproducer tube, a shutter keying circuit, and circuit means connecting said identity selector circuit to said reproducer keying circuit, said scanning circuit and said shutter keying circuit.

7. A television facsimile communication system comprising in combination a television transmitter, a television receiver, and recording means operatively associated with said receiver, said transmitter producing a carrier wave and having a television pick-up tube for modulating said carrier wave with intelligence obtained from a printed sheet of information, identity modulating means for identity modulating said carrier wave, delay means operatively connecting said pick-up tube and said identity modulating means whereby the pick-up tube is energized after a predetermined time has elapsed from the time that the carrier wave was identity modulated, said television receiver having an identity selector adapted to be energized by the identity modulated carrier wave, a television reproducing tube, delay means operatively connecting said identity selector and said television reproducing tube, said delay means energizing said reproducing tube only after a time has elapsed which is substantially equal to the time delay between the identity modulation and the intelligence modulation of the carrier wave whereby the reproduction tube produces a reproduction of the printed information transmitted by the transmitter, and recording means operatively connected to said reproduction tube for providing a record of the information produced by the reproducer tube.

8. A television facsimile communication system comprising in combination a television transmitter, a television receiver, and recording means operatively associated with said receiver, said transmitter being adapted for one-frame transmission and requiring the presence of a pulse to initiate each frame, identity modulating means and pick-up tube means in said transmitter, said last two mentioned means identity modulating and intelligence modulating the carrier wave produced by said transmitter, respectively, transmitter delay means operatively connecting said identity modulating means and said pick-up tube means for producing a predetermined time delay between the identity modulation and the intelligence modulation of the carrier wave, said television receiver having an identity selector which is adapted to be energized upon receipt of the identity modulated carrier wave, a television reproducing tube in said receiver, receiver delay means operatively connecting said identity selector and said reproducing tube, said receiver delay means energizing said reproducer tube only after a time has elapsed which is substantially equal to the delay between the identity modulation and the intelligence modulation of the carrier wave whereby a one frame reproduction is produced by the reproducer tube, said recording means being operatively associated with said reproducer tube for providing a record of the information produced by said reproducer tube.

9. A television facsimile communication system adapted for one frame transmission and reception of printed intelligence comprising in combination a television transmitter, a television receiver, and recording means associated with said receiver, said transmitter producing a carrier wave, an identity circuit for identity modulating said carrier wave, television pick-up tube means including a television pick-up tube for scanning printed intelligence for only one frame and intelligence modulating said carrier wave, time delay means connecting said identity circuit and said television pick-up tube means for producing a time delay between the identity modulation and the intelligence modulation of said carrier wave, an identity selector circuit in said television receiver adapted to be energized by the identity modulated carrier wave, a reproducing circuit including a television reproducing tube in said receiver for producing a one frame reproduction from said intelligence modulated carrier wave, a time delay circuit connecting said identity selector circuit and said television reproducing circuit for producing a time delay substantially equal to the time delay between the identity modulation and intelligence modulation of the carrier wave, whereby a one frame reproduction is produced by the television reproducing tube, said recording means being operatively connected to said reproducing tube for recording the one frame reproduction produced by said reproducing tube.

References Cited in the file of this patent

UNITED STATES PATENTS

| | | |
|---|---|---|
| 2,196,867 | Knopp | Apr. 9, 1940 |
| 2,231,971 | Tubbs | Feb. 18, 1941 |
| 2,251,525 | Rosenthal | Aug. 5, 1941 |
| 2,343,568 | Morrison | Mar. 7, 1944 |
| 2,354,199 | Collins | July 25, 1944 |
| 2,364,357 | Halstead | Dec. 5, 1944 |
| 2,369,783 | Homrighous | Feb. 20, 1945 |
| 2,398,641 | Homrighous | Apr. 16, 1946 |
| 2,402,083 | Reid | June 11, 1946 |
| 2,404,839 | Hammond | July 30, 1946 |
| 2,454,651 | Homrighous | Nov. 23, 1948 |
| 2,504,734 | Schmidling | Apr. 18, 1950 |
| 2,529,264 | Ridings | Nov. 7, 1950 |
| 2,547,598 | Roschke | Apr. 3, 1951 |
| 2,619,530 | Roschke | Nov. 25, 1952 |